Dec. 18, 1934.   T. B. FORD   1,984,792
REGULATING VALVE
Filed Oct. 25, 1930   2 Sheets-Sheet 1
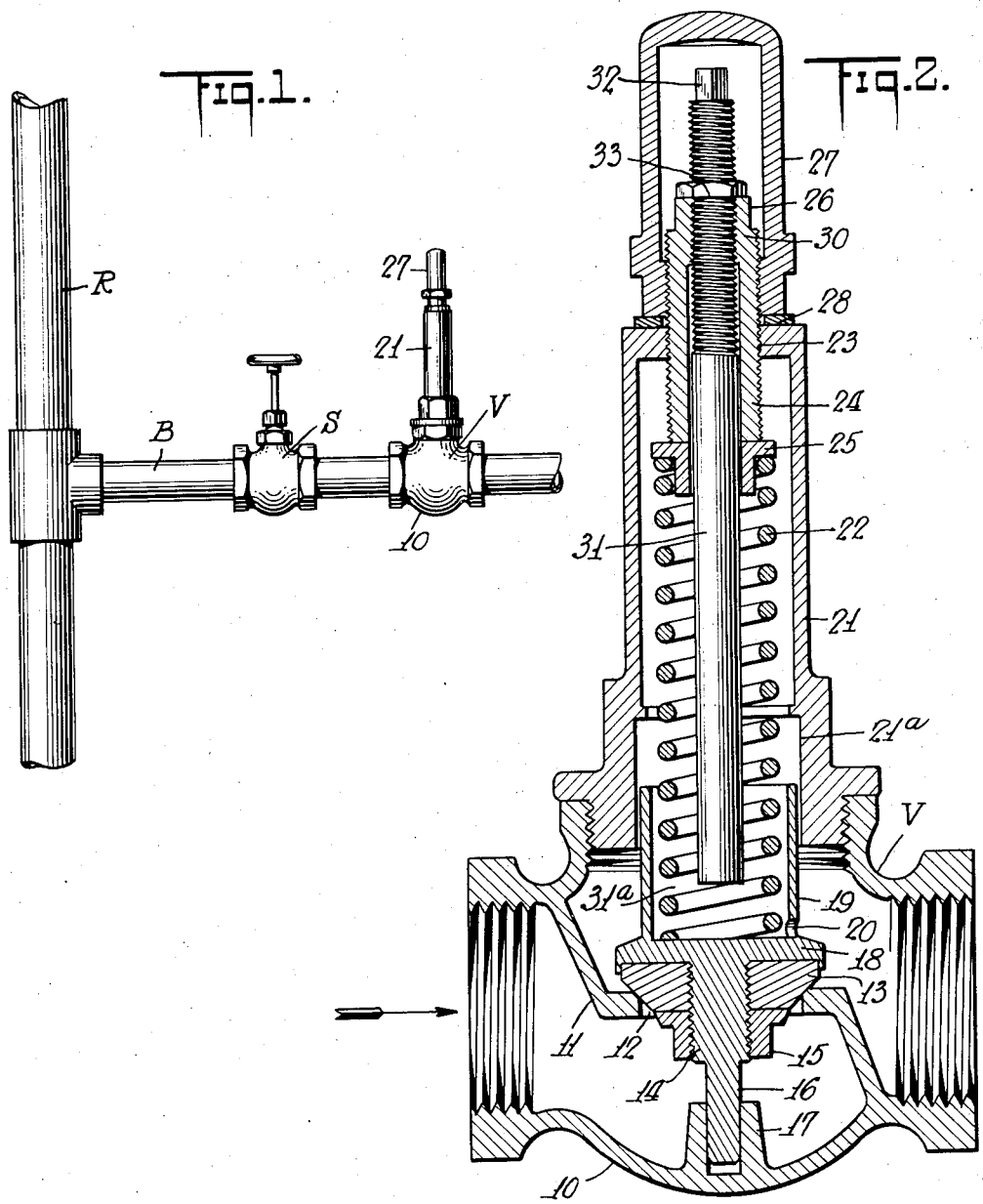
INVENTOR
Thomas B. Ford
BY
Dean Fairbank, Hirsch & Foster
ATTORNEYS Dec. 18, 1934.  T. B. FORD  1,984,792
REGULATING VALVE
Filed Oct. 25, 1930  2 Sheets-Sheet 2

INVENTOR
*Thomas B. Ford*
BY
*Dean, Fairbank, Hirsch & Foster*
ATTORNEYS

Patented Dec. 18, 1934

1,984,792

UNITED STATES PATENT OFFICE 1,984,792

REGULATING VALVE

Thomas B. Ford, New York, N. Y.

Application October 25, 1930, Serial No. 491,141

1 Claim. (Cl. 50—23)

This invention relates to flow regulators and is particularly concerned with flow regulating valves of the pressure reducing type.

In fluid supply systems of the type for which the present invention is designed it is necessary in order to prevent hammering and gurgling in the pipes to coordinate the pressure and volume of the fluid flow. To accomplish such coordination the present day systems utilize a pressure responsive valve in conjunction with a separate manually set flow control valve, such combination requiring joint manipulation of the separate valves in order to strike an approximate balance and effect the required coordination.

It is therefore among the objects of the present invention to provide a single valve arranged to provide automatic, exact correlation of adequate pressure to required volume.

Another object is to provide a single regulator valve including independently adjustable volume regulating means and pressure regulating means.

Another object of the invention is to provide a pressure responsive valve working against an operating spring with means adjustable independently of the spring adjusting means to limit the water pressure actuated movement of the valve against the action of the spring and thereby control volume.

Another more specific object is to provide a normally spring seated pressure responsive valve, in which the water pressure impelled opening of the valve may be selectively limited without altering the adjustment of the spring tension.

Another more specific object is to provide a normally open, spring urged, pressure responsive valve in which the water pressure impelled closing movement of the valve may be adjustably limited independently of the adjustment of the spring tension.

Another object is to provide a valve structure in which both spring tension adjustment means and volume regulating adjustment means are enclosed against tampering.

Another object is to provide a novel, simple and efficient pressure and volume control valve which may be simply adjusted and easily retained in adjusted position and in which the several features cooperate and are coordinated to provide a structure which is particularly adapted to meet the demands of economic manufacture.

Another object is to provide the foregoing desiderata in a unitary, self-contained valve structure which may be readily set for regulating the pressure to volume ratio of an associated pressure system.

While the present invention is applicable in its broader sense to various structural embodiments, two preferred embodiments of the invention are herein disclosed, each of which comprises a spring urged reducing valve member including means for varying the tension of the spring and associated means for limiting the water pressure actuated movement of the valve. In both instances the valve limiting (volume controlling) means may be individually adjusted without varying the spring tension.

In both instances the single valve is adjustable for independent volume and pressure coordination and the necessity of manual adjustment of an independent flow controlling valve is avoided.

Fig. 1 is a view illustrating the position of the regulator in an associated water supply system.

Fig. 2 is a vertical section through one form of valve embodying the present invention.

Figure 3:
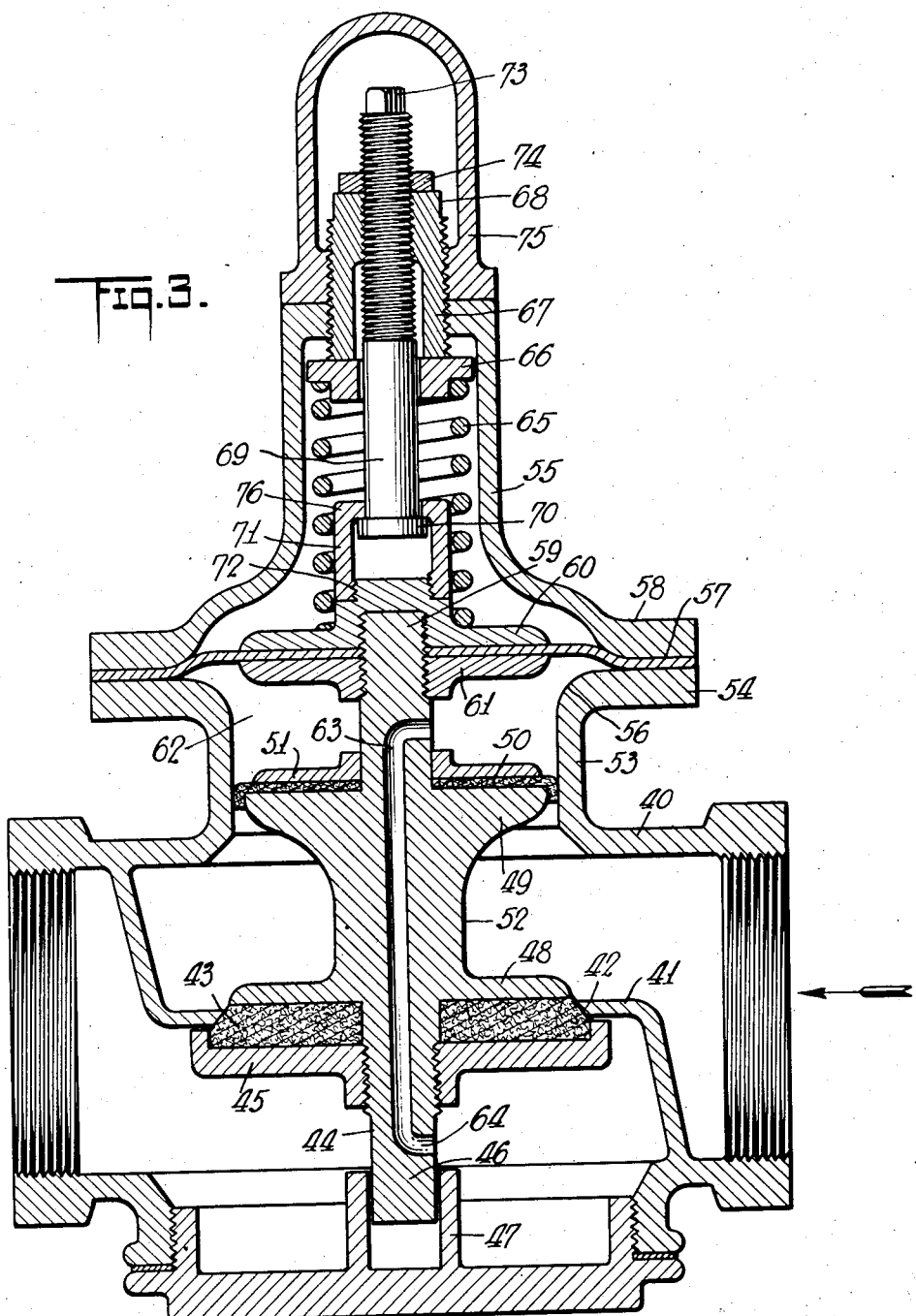
Fig. 3 is a similar view showing a modification.

By referring to Fig. 1, it will be seen that the present valve indicated at V is arranged in conjunction with a conventional stop valve S in a branch pipe B of the main supply pipe R of a gravity system or the like. It will be understood that the dual regulating function of the present valve permits the use of the valve S as merely an emergency or stop valve, while pressure and volume coordination is maintained solely by the valve V.

The specific structure of the valve illustrated in Fig. 2 consists of a valve body 10 of conventional design, the opposite sides of which are threaded for connection with sections of the branch pipe B. Across the valve body, an apertured partition 11 extends, forming a seat for a valve disc assembly, which illustratively consists of a gasket 13 secured upon a threaded stud 14 by means of a securing nut 15. The stud 14 includes a depending reduced portion 16 movable in a recessed, guiding protrusion 17 of the bottom of the body 10.

The stud 14 depends from an integrally formed valve disc 18, upwardly from which an apertured open topped cylindrical shell or valve stem 19 extends, its aperture communicating with the low or constant pressure side of the valve, the direction of fluid flow through the valve being indicated by the arrow.

The valve body 10 has mounted thereon a hollow bonnet or equivalent device 21, the lower end of which is bored as at 21a to receive for loose telescopic fit the shell 19, whereby the aperture 20 permits fluid to enter the bonnet from the low pressure side to urge the valve toward its seat.

A spring 22 for urging the valve to closed position is mounted within the bonnet or extension 21, its inner end being received within the shell 19 and abutting the disc 18. The upper end of the bonnet is internally threaded, as at 23, to adjustably receive therethrough a tubular tensioning bushing 24, the lower end of which abuts a spring retainer 25 which receives therearound the upper terminal convolutions of the spring 22.

The upwardly extending end 30 of the bushing 24 has a flattened angular wrench receiving portion 26, by which the bushing may be screwed up or down to adjust the pressure applied by the spring 22 to seat the valve. For locking the bushing 23 in its adjusted position, a terminal cap 27 is threaded for engagement over the threads of end 30 of the bushing 24, its inner end engaging a sealing washer 28, the cap thus acting as a pressure seal and serving also as a lock nut for the bushing.

A control stem 31 is adjustably mounted through the bushing, its upper end being threadedly engaged with the internal threads of the bushing, while its lower end 31a extends within the spring 22 terminating within the shell 19 to limit opening movement of the valve. The upper end of the stem terminates in a square wrench receiving end 32 and a lock nut 33 may be provided for retaining the stem in its adjusted position.

It will be noted that the cap 27 in addition to its sealing function protects the outer ends of both the rod or stop 31 and the bushing 26, and at the same time prevents unauthorized manipulation or meddling with the setting of the valve.

In the operation of this embodiment of the invention when fluid under pressure is supplied from the pipe R to the branch B, the valve S being fully open, it will act to raise the valve disc against the tension of the spring 22, the valve acting as a check valve should pressure become low enough to fail to overcome the spring tension. Increasing pressure in the system will cause greater opening of the valve. The stem 31 may be adjusted to definitely limit volume of flow, this being effected by limiting the upward movement of the valve in response to pressure applied thereto.

When it is desired to vary the pressure at which the valve it set, the cap 27 is removed and the bushing rotated by applying a wrench to the portion 26. If the bushing is turned to move inwardly and increase the pressure of the spring upon the seat, it will be seen that the stem will move inwardly therewith, and while pressure is increased the volume adjustment is decreased.

The pressure control adjustment may easily be made, however, independently of the volume adjustment by retention of the stem 31 against turning through the application of a wrench to the squared portion 32 thereof. Should it be desired to adjust the volume independently of the pressure, the bushing may be retained while the nut 33 is loosened and the stem 31 rotated to vertically adjust the stem. By this arrangement, it will be seen that the present invention provides a simple and efficient regulator valve which may be independently adjusted to separately control both the volume and pressure of fluid passing therethrough.

With reference to that form of the invention shown in Fig. 3, it will be seen that the structure also constitutes a pressure regulating valve with adjustable limiting means for the opening thereof, but is distinguished from that form of the invention shown in Fig. 2 by being a normally open valve moving against the tension of its unseating spring to close the valve upon increased pressure of the water flowing therethrough. The structure comprises a valve body 40 having an apertured partition 41 forming a valve seat 42. The valve washer or gasket is indicated by the numeral 43 and is retained in position upon a valve stem 44 by a threaded securing plate 45, the lower end of the valve stem 46 being guided within a recessed guiding block 47 removably mounted in the lower wall of the body 40.

The valve plate proper as indicated by the numeral 48 is formed integrally with the valve stem 44, from which an enlarged portion of the stem extends upwardly and outwardly to form a mushroom headed piston 49 upon which is mounted a washer 50 secured on a piston head 49 by a securing plate 51. Intermediate the plate 48 and the head 49 the walls of the stem proper as indicated by the numeral 52 taper gradually down and the inner faces of both the head and plate which are of equal area are subject to balancing pressure from the incoming side of the valve, the water moving in the direction of the arrow.

The piston assembly slides within a cylinder forming extension 53 of the valve body proper. Extension 53 is flanged as at 54 and has mounted thereon a bonnet or extension 55. The upper end of the extension by virtue of the configuration of the flange 54 tapers outwardly at 56 and the edge of a flexible diaphragm 57 is clamped between the flange 54 and the lower connecting flange 58 of the bonnet 55.

The valve stem itself terminates as at 59 in threaded connection with a diaphragm connecting plate 60, the central area of the diaphragm being secured thereagainst by locking plate 61.

It will thus be seen that the construction provides a cylinder space 62 in which the piston head may slide, and which is enlarged at its upper end to provide a greater area to receive pressure on the diaphragm 57 than the area of the upper face of the piston.

The valve stem is provided with a pressure bypass passageway 63 which communicates at its upper end with the cylinder space and extends downwardly therefrom through the central portion of the stem terminating at 64 in communication with the low pressure side of the valve. This arrangement is such that an increase of pressure on the low pressure side provides increase of pressure in the cylinder, and in view of the greater area of the diaphragm 57, the stem will be moved upwardly, overcoming the pressure exerted on the smaller area of the upper face of the piston head, and thus the valve will be moved toward closed position upon increase of water pressure.

For normally urging the valve to open position a spring 65 is provided within the bonnet 55, its lower end resting upon the upper face of the disc 60, while its upper end reacts against an aligning plate 66 which may be vertically adjusted to vary the spring tension by a bushing 67, which is threaded adjustably through the upper end of the valve bonnet, its exterior end terminating in a wrench receiving portion 68.

For limiting the movement of the valve both in response to the spring tension and in response to water pressures there is threadedly connected through the bushing 68 a limiting element or rod 69, the lower end of which terminates in a head 70 receivable in and secured by a housing 71 threadedly connected as at 72 to the plate 60. The arrangement is such that lost motion connection is provided between the rod or stop 69 and the valve stem proper so that the rod acts as a limiting means and may act by movement in either direction to its full extent as a positive valve stem controlling means.

The upper end of the rod 69 terminates in squared wrench receiving portion 73, a lock nut 74 being provided to retain the rod against accidental turning movement within the bushing 67. For locking the bushing 67, a protective cap 75 is provided which serves the dual function of a locking nut for the bushing and a protector for the extending ends of both the bushing and the rod.

In the operation of this form of the invention, it will be seen that the valve stem is normally moved downwardly by the spring to permit a flow of water through the valve. The extent to which the valve may open in response to the spring is primarily governed by the rod 69, vertical downward adjustment thereof permitting increased opening of the valve. As fluid passes through the valve in the direction of the arrow, an increased pressure is built up on the outlet side of the valve, and is communicated through the port 63 to the piston chamber 62 where it acts upon the diaphragm to move the valve against the tension of the spring 65 toward seated position. By adjusting the tension of the spring 65 and the position of the rod 69, it will be seen that a coordination between the volume and pressure is attained, increased pressure being effective to move the valve toward closed position to diminish the volume of flow therethrough. The valve is designed for use in connection with a stop valve S as shown in Fig. 1, so that opening or closing of the branch pipe may be accomplished without disturbing the valve adjustment. In some case, however, it may be desired to use the valve as a stop valve in which case the rod 69 is moved upwardly until its head 70 engages the securing inturned flange 76 of the housing 71 and moves the valve against the tension of its spring to fully seated position, this being the arrangement of parts as illustrated in Fig. 3.

From the foregoing, it will be readily seen that both forms of the present invention provide spring urged pressure responsive valves including limiting means for controlling the opening thereof. In both instances, similar spring bushings and interconnected stems are provided which may be simultaneously or independently adjusted, and in both instances positive limiting means, adjustable independently of the valve springs is operative to positively check water pressure actuated movement of the valve. Both forms of the invention also comprise a passage through part of the valve such as the duct 63 in Fig. 3 and aperture 20 in Fig. 2 to admit fluid on the low pressure side of the valve to a space within the valve body where the pressure of the fluid tends to move the valve towards closed position.

It will be thus seen that there is herewith described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

I claim:

A pressure reducing valve including a body having an inlet and an outlet therein and a valve seat between the inlet and outlet, a valve coacting with said seat, a bonnet rising from the top of the body and having a threaded opening in its upper end, an internally and externally threaded bushing coaxially disposed with respect to the bonnet and adjustable in the threaded opening through the top thereof, a coiled spring also coaxial with the bonnet, acting on the valve to move it in one direction and reacting against the bushing, an externally threaded stem, said bushing having a reduced threaded portion in which the stem is adjustable, said stem being coaxial with the bonnet and bushing and spring and adapted to limit the opening of the valve against action of the spring, the threaded upper end of said rod extending outwardly through the bushing and means for locking the adjustable elements in position and rendering them tamper-proof, including a nut screwed onto the threaded end of the stem and locking it against adjustment and a cap screwed onto the threaded exterior of the bushing and against the top of the bonnet, said cap concealing said bushing and projecting rod end and protecting them against tamper.

THOMAS B. FORD.